US012203300B2

(12) United States Patent
Bao et al.

(10) Patent No.: US 12,203,300 B2
(45) Date of Patent: Jan. 21, 2025

(54) LOCK DEVICE AND MOTOR VEHICLE

(71) Applicant: SHANGHAI INGIN AUTO TECHNOLOGY CO., LTD., Shanghai (CN)

(72) Inventors: Youxia Bao, Shanghai (CN); Xinchun Zheng, Shanghai (CN)

(73) Assignee: SHANGHAI INGIN AUTO TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/292,278

(22) PCT Filed: Jul. 18, 2022

(86) PCT No.: PCT/CN2022/106246
§ 371 (c)(1),
(2) Date: Jan. 25, 2024

(87) PCT Pub. No.: WO2023/005710
PCT Pub. Date: Feb. 2, 2023

(65) Prior Publication Data

US 2024/0263496 A1 Aug. 8, 2024

(30) Foreign Application Priority Data

Jul. 26, 2021 (CN) ......................... 202110846438.1

(51) Int. Cl.
*E05B 85/26* (2014.01)
*E05B 85/24* (2014.01)

(52) U.S. Cl.
CPC ............ *E05B 85/26* (2013.01); *E05B 85/243* (2013.01)

(58) Field of Classification Search
CPC ........ E05B 85/20; E05B 85/24; E05B 85/243; E05B 85/26
See application file for complete search history.

(56) References Cited

U.S. PATENT DOCUMENTS 8,480,138 B2 7/2013 Bendel et al.
9,151,092 B2 * 10/2015 Scholz .................... E05B 85/26
11,015,375 B2 * 5/2021 Lebsak ................. E05B 85/243
(Continued)

FOREIGN PATENT DOCUMENTS

CN 104169509 A 11/2014
CN 106471197 A 3/2017
(Continued)

OTHER PUBLICATIONS

International Search Report of PCT/CN2022/106246.
Written Opinion of PCT/CN2022/106246.

*Primary Examiner* — Alyson M Merlino

(57) ABSTRACT

The present disclosure provides a lock device, including: a lock tongue; a first pawl that can lock the lock tongue at a first locking position; a second pawl that can lock the lock tongue at a second locking position; a control rod, where a rotating action of the second pawl can be partially transmitted to the first pawl through the control rod, so that the first pawl unlocks the lock tongue from the first locking position; and an elastic part that applies elastic force to the control rod, so that the control rod drives the first pawl to the first locking position. The first pawl and the second pawl have different rotation centers. The present disclosure further provides a motor vehicle.

8 Claims, 12 Drawing Sheets

(56) References Cited

U.S. PATENT DOCUMENTS

| | | | | |
|---|---|---|---|---|
| 11,933,091 | B2 * | 3/2024 | Weichsel | E05B 85/26 |
| 11,965,367 | B2 * | 4/2024 | Okawa | E05B 85/26 |
| 2011/0012376 | A1 * | 1/2011 | Hunt | E05B 85/26 292/216 |
| 2020/0208444 | A1 * | 7/2020 | Kajigai | E05B 85/243 |
| 2020/0354998 | A1 | 11/2020 | Rosales | |

FOREIGN PATENT DOCUMENTS

| | | | |
|---|---|---|---|
| CN | 113494218 | A | 10/2021 |
| CN | 216921741 | U | 7/2022 |

* cited by examiner

LOCK DEVICE AND MOTOR VEHICLE

CROSS-REFERENCE TO RELATED APPLICATIONS

This Application is a national stage application of PCT/CN2022/106246. This application claims priorities from PCT Application No. PCT/CN2022/106246, filed Jul. 18, 2022, and from the Chinese patent application 202110846438.1 filed Jul. 26, 2021, the content of which are incorporated herein in the entirety by reference.

TECHNICAL FIELD

The present disclosure relates to the technical field of lock devices, and to a lock device for a cover or door, which is suitable for a cover or door of a motor vehicle or building.

BACKGROUND

A lock device for a cover or door in the prior art is generally designed with a single lock tongue and a single pawl, and locking reliability of the lock device is challenged.

In addition, when the cover or door is subjected to great sealing force, unlocking force of the existing lock device is also great, which causes great operating force of a user.

SUMMARY

In order to resolve at least one of the foregoing technical problems, the present disclosure provides a lock device and a motor vehicle.

The lock device and the motor vehicle of the present disclosure are realized through the following technical solutions.

According to an aspect of the present disclosure, a lock device is provided, comprising: a lock tongue; a first pawl that can engage the lock tongue in a first locking position; a second pawl that can engage the lock tongue in a second locking position; a control member, wherein a rotating action of the second pawl can be partially transmitted to the first pawl through the control member, so that the first pawl unlocks the lock tongue from the first locking position; and an elastic part that applies an elastic force to the control member, so that the control member drives the first pawl to the first locking position, the first pawl and the second pawl have different rotation centers.

According to the lock device in at least one implementation of the present disclosure, the lock tongue comprises a first locking surface and a second locking surface, the first pawl engages the lock tongue in the first locking position through the first locking surface, and the second pawl engages the lock tongue in the second locking position through the second locking surface.

According to the lock device in at least one implementation of the present disclosure, the first pawl comprises a first engagement surface, and the first pawl is engaged with the first locking surface through the first engagement surface, so as to lock the lock tongue in the first locking position; and the second pawl comprises a second engagement surface, and the second pawl is engaged with the second locking surface through the second engagement surface, so as to lock the lock tongue in the second locking position.

According to the lock device in at least one implementation of the present disclosure, the first engagement surface is an arc-shaped surface, and a center of the first engagement surface does not coincide with the rotation center of the first pawl, so that in an event that pressed, the first engagement surface generates a torque that enables the first pawl to rotate in a direction in which the first pawl disengages from the lock tongue.

According to the lock device in at least one implementation of the present disclosure, a center of the first engagement surface is located at an outer position relative to the rotation center of the first pawl, and the outer position is not located in a position area between a rotation center of the lock tongue and the rotation center of the first pawl.

According to the lock device in at least one implementation of the present disclosure, the first pawl locks the lock tongue at the first locking position based on a first driving action of the control member, and the first pawl releases the lock tongue from the first locking position based on a second driving action of the control member.

According to the lock device in at least one implementation of the present disclosure, the first pawl further comprises a first limit surface, and the control member applies the first driving action to the first limit surface, so that the first engagement surface of the first pawl is engaged with the first locking surface of the lock tongue to maintain the lock tongue in the first locking position.

According to the lock device in at least one implementation of the present disclosure, the first pawl further comprises a first drive surface, and the control member applies the second driving action to the first drive surface, so that the first engagement surface of the first pawl is disengaged from the first locking surface of the lock tongue to release the lock tongue from the first locking position.

According to the lock device in at least one implementation of the present disclosure, the lock device further comprises a limit block. When the first pawl engages the lock tongue in the first locking position based on the first driving action of the control member, the limit block limits the control member in a first limit position, so that the control member maintains engagement of the first engagement surface of the first pawl with the first locking surface of the lock tongue.

According to the lock device in at least one implementation of the present disclosure, when the first pawl releases the lock tongue from the first locking position based on the second driving action of the control member, the control member separates from the first limit position.

According to the lock device in at least one implementation of the present disclosure, in an event that the control member is limited in the first limit position by the limit block, the elastic part applies the elastic force to the control member, to maintain the control member in the first limit position.

According to the lock device in at least one implementation of the present disclosure, the second pawl comprises a clamping slot part, the control member comprises a driven part, and the driven part is disposed in the clamping slot part, so that the control member can be driven by an action of the second pawl.

According to the lock device in at least one implementation of the present disclosure, the second pawl comprises a second drive surface, and the second drive surface is used for receiving a driving action of an external drive mechanism.

According to the lock device in at least one implementation of the present disclosure, the driven part comprises a cylindrical part and a limit part, the cylindrical part is disposed in the clamping slot part through insertion, and the limit part limits the cylindrical part in the clamping slot part, to prevent the driven part from separating from the clamping slot part.

According to the lock device in at least one implementation of the present disclosure, the control member comprises a control member engagement surface and a control member limit surface, the control member applies the first driving action to the first limit surface of the first pawl through the control member engagement surface, and the limit block limits the control member through the control member limit surface.

According to the lock device in at least one implementation of the present disclosure, the control member comprises a control member drive part, and the control member applies the second driving action to the first drive surface of the first pawl through the control member drive part.

According to the lock device in at least one implementation of the present disclosure, the first drive surface is in a concave shape.

According to the lock device in at least one implementation of the present disclosure, a plane part is formed on the control member drive part, and the elastic part applies the elastic force to the control member through the plane part.

According to the lock device in at least one implementation of the present disclosure, the second driving action separates the first pawl from the first locking position.

According to the lock device in at least one implementation of the present disclosure, the elastic part applies the elastic force to the plane part of the control member, to push the control member to the first limit position.

According to the lock device in at least one implementation of the present disclosure, the limit block comprises a limit fitting surface, and the limit block limits, through the limit fitting surface, the control member in the first limit position.

According to another aspect of the present disclosure, a motor vehicle is provided, comprising a cover or door, wherein the cover or door is provided with the lock device according to any one of the foregoing descriptions.

BRIEF DESCRIPTION OF THE DRAWINGS

The accompanying drawings show exemplary implementations of the present disclosure and, together with the description, serve to explain the principles of the present disclosure. These accompanying drawings are included to provide a further understanding of the present disclosure and are incorporated in and constitute a part of this specification.

DESCRIPTION OF THE REFERENCE NUMERALS

Figure 1:
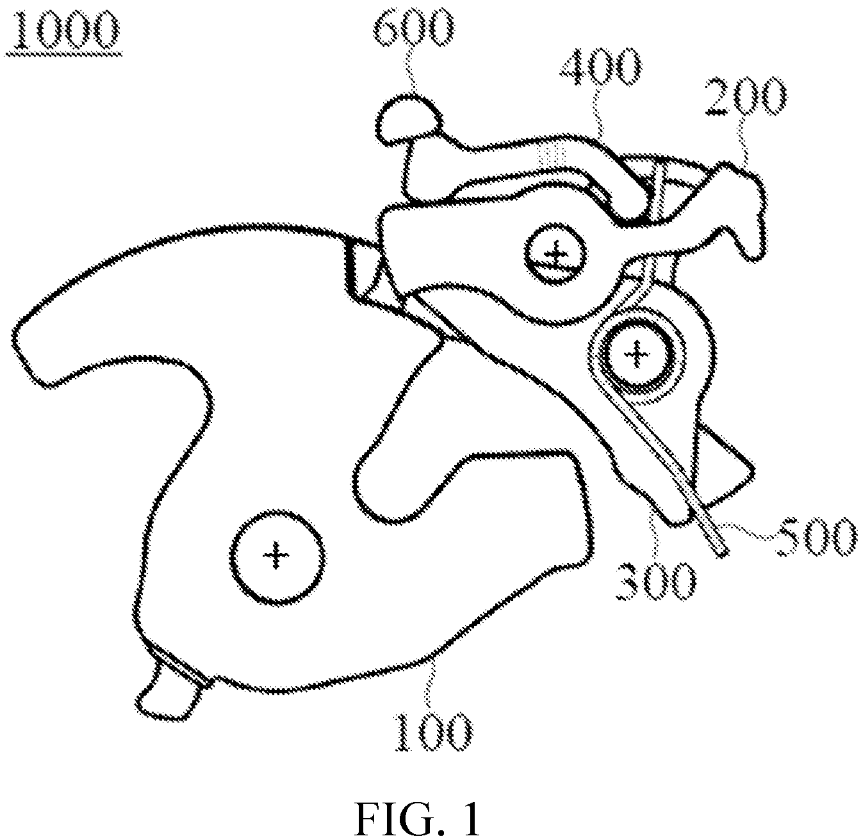
FIG. 1 is a schematic structural diagram of one perspective of a lock device according to an implementation of the present disclosure.

100: lock tongue;
101: first locking surface;
102: second locking surface;
200: first pawl;
201: first engagement surface;
202: first limit surface;
203: first drive surface;
300: second pawl;
301: second engagement surface;
302: clamping slot part;
303: second drive surface;
400: control member;
401: control member engagement surface;
402: control member limit surface;
403: drive part;
404: plane part;
405: cylindrical part;
406: limit part;
500: elastic part;
501: elastic arm;
600: limit block;
601: limit fitting surface;
1000: lock device.

DETAILED DESCRIPTION

The present disclosure is further described in detail below with reference to the accompanying drawings and implementations. It can be understood that the specific implementations described herein are only used to explain related content, but are not intended to limit the present disclosure. It should be further noted that, for ease of description, only a part related to the present disclosure is shown in the accompany drawings.

It should be noted that, on the premise of no conflict, the implementations in the present disclosure and features in the implementations may be combined with each other. Technical solutions of the present disclosure are described in detail below with reference to the accompanying drawings in conjunction with the implementations.

Unless otherwise specified, the illustrated exemplary implementations/embodiments are understood as providing exemplary features of various details of some ways in which technical concepts of the present disclosure may be implemented in practice. Therefore, unless otherwise specified, the features of various implementations/embodiments may be additionally combined, separated, interchanged, and/or rearranged without departing from the technical concepts of the present disclosure.

The use of crosshatch and/or shade in the accompanying drawings is generally used to make a boundary between adjacent parts clear. In this case, unless otherwise specified, the presence or absence of the crosshatch or shade does not express or indicate any preference or requirement for a specific material, material property, size, proportion of a part, commonality between illustrated parts, and/or any other characteristic, attribute, property, and the like of the part. In addition, in the accompanying drawings, a size and a relative size of a part may be exaggerated for clarity and/or a purpose of description. When exemplary embodiments may be implemented differently, a specific process sequence may be performed in an order different from an order described. For example, two consecutively described processes may be performed substantially simultaneously or in an order reverse to an order described. In addition, the same reference numerals denote the same part.

When a part is referred to as being "on" or "over", "connected to", or "coupled to" another part, this part may be directly on, connected to, or coupled to the another part, or an intermediate part may exist. However, when a part is referred to as being "directly on", "directly connected to", or "directly coupled to" another part, an intermediate part does not exist. Therefore, the term "connected" may refer to physically connected, electrically connected, and the like, and an intermediate part exists or does not exist.

For a purpose of description, the present disclosure may use spatially relative terms such as "beneath . . . ", "below . . . ", "under . . . ", "lower", "above . . . ", "upper", "on . . . ", "higher", and "side (for example, in a "sidewall")" to describe a relationship between one part and another (other) part as shown in the accompanying drawings. The spatially relative terms are intended to include different orientations of a device in use, operation, and/or manufacturing in addition to the orientations depicted in the accompanying drawings. For example, if the device in the accompanying drawings is turned over, a part that is described as "below" or "beneath" another part or feature is then located "above" the other part or feature. Therefore, the exemplary term "below . . . " may include two orientations: "above" and "below". In addition, the device may be further located (for example, the device is rotated 90 degrees or at another orientation). In this case, the spatially relative terms used herein are explained accordingly.

The terms used herein are for a purpose of describing specific embodiments and are not intended to put a limit. As used herein, unless otherwise clearly specified in the context, singular forms "one" ("a" and "an") and "said (the)" are intended to include plural forms as well. In addition, when used in this specification, the terms "comprise" and/or "include" and variations thereof indicate presence of the described features, entireties, steps, operations, parts, assemblies and/or a combination thereof, but does not exclude presence or addition of one or more other features, entireties, steps, operations, parts, assemblies and/or a combination thereof. It should be further noted that, as used herein, the terms "substantially" and "about", and other similar terms are used as approximate terms rather than degree terms, and therefore, they are used to explain an inherent deviation that is of a measured value, a calculated value, and/or a provided value and that will be recognized by those of ordinary skill in the art.

First, a structure of a lock device 1000 of the present disclosure is described in detail with reference to FIG. 1 to FIG. 10. "+" in each accompanying drawing is a label of a rotation center.

According to an aspect of the present disclosure, a lock device is provided. Refer to FIG. 1. A lock device 1000 according to an implementation of the present disclosure includes: a lock tongue 100, a first pawl 200, a second pawl 300, a control member 400, and an elastic part 500.

The first pawl 200 can engage the lock tongue 100 in a first locking position (primary locking position).

The second pawl 300 can engage the lock tongue 100 in a second locking position (secondary locking position). A rotating action of the second pawl 300 can be partially transmitted to the first pawl 200 through the control member 400, so that the first pawl 200 unlocks the lock tongue 100 from the first locking position.

The elastic part 500 applies an elastic force to the control member 400, so that the control member 400 drives the first pawl 200 to the first locking position.

The first pawl 200 and the second pawl 300 have different rotation centers.

According to the lock device 1000 of this implementation, the rotating action of the second pawl 300 is transmitted to the first pawl 200 through the control member 400, so that the first pawl 200 unlocks the lock tongue 100 from the first locking position, that is, the first pawl 200 is separated from the first locking position, to unlock the lock tongue 100.

The lock device 1000 of this implementation is provided with the elastic part 500. The elastic part 500 applies the elastic force to the control member 400, so that the control member 400 drives the first pawl 200 to the first locking position, to implement a locking process.

Figure 2:
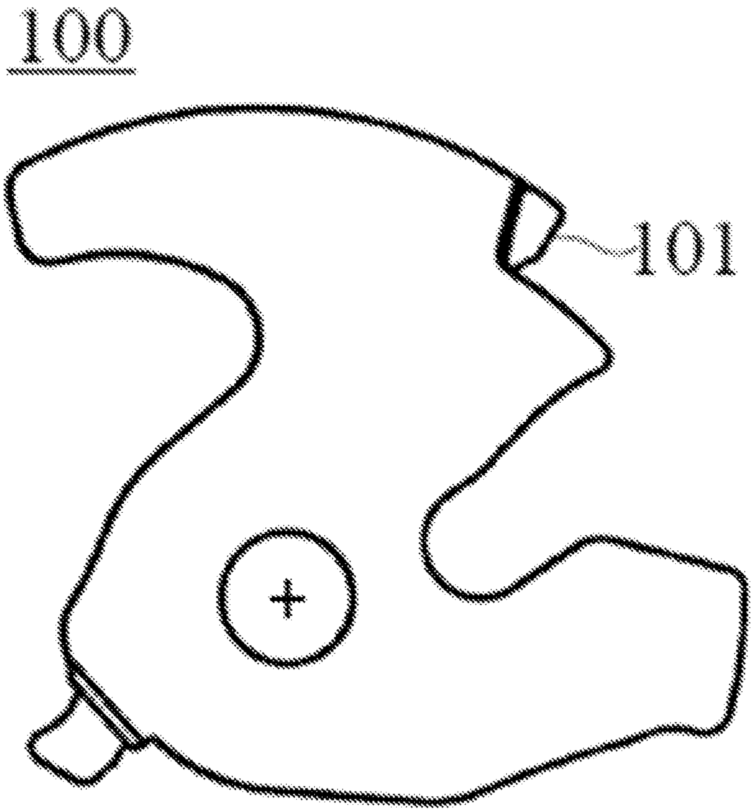
FIG. 2 is a schematic structural diagram of one perspective of a lock tongue of the lock device according to an implementation of the present disclosure.
Figure 3:
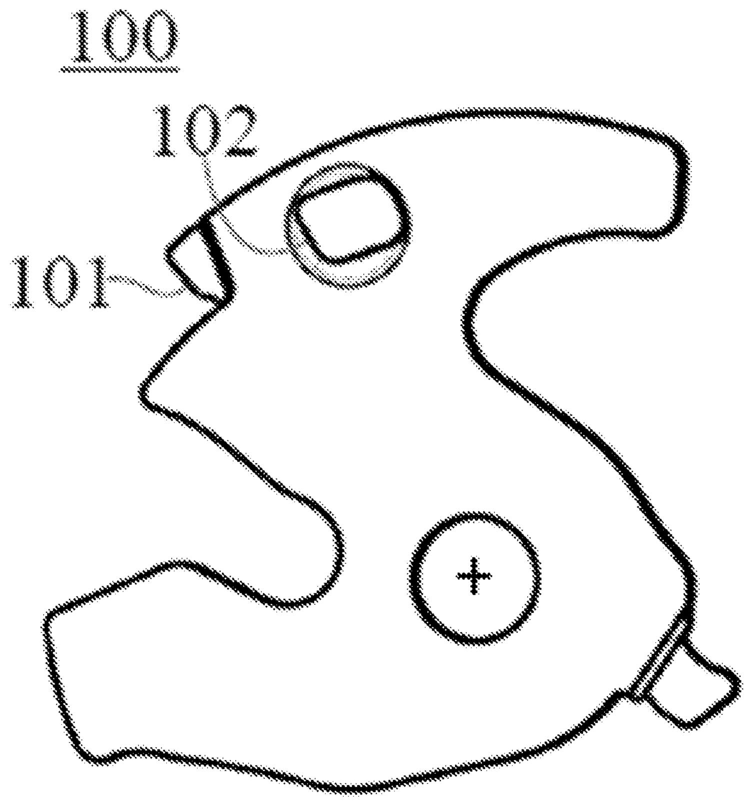
FIG. 3 is a schematic structural diagram of another perspective of the lock tongue of the lock device according to an implementation of the present disclosure.

Refer to FIG. 2 and FIG. 3. For the lock device 1000 of the present disclosure, the lock tongue 100 of the lock device 1000 includes a first locking surface 101 and a second locking surface 102, the first pawl 200 locks the lock tongue 100 in the first locking position through the first locking surface 101, and the second pawl 300 locks the lock tongue 100 in the second locking position through the second locking surface 102.

Preferably, the first locking surface 101 and the second locking surface 102 are not in a same plane.

Preferably, a plane in which the first locking surface 101 is located is parallel or roughly parallel to the second locking surface 102.

According to an alternative implementation of the present disclosure, the first locking surface 101 may include a part of an arc-shaped surface, and the second locking surface 102 may also include a part of an arc-shaped surface.

Figure 4:
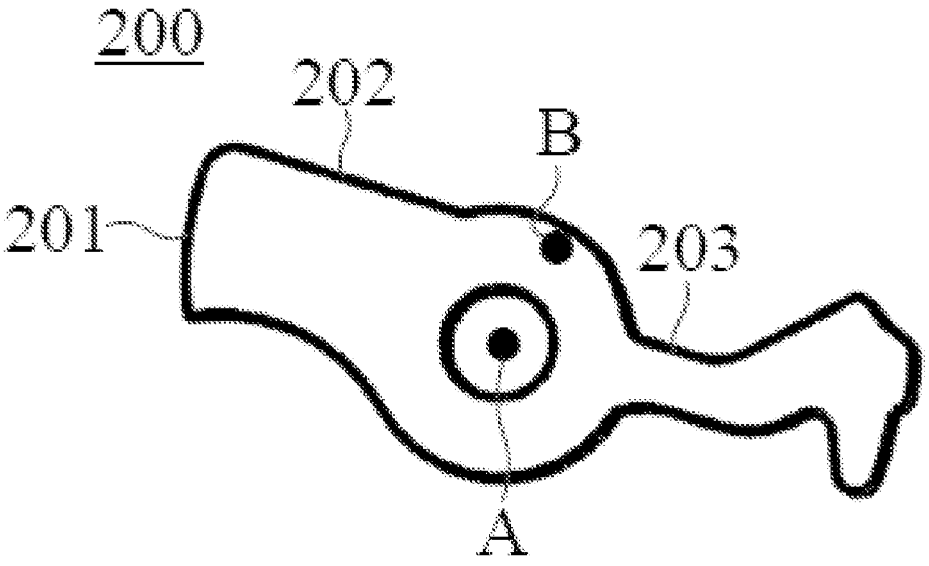
FIG. 4 is a schematic structural diagram of a first pawl of the lock device according to an implementation of the present disclosure.

Preferably, refer to FIG. 4. For the lock device 1000 of each of the foregoing implementations, the first pawl 200 includes a first engagement surface 201. The first pawl 200 is engaged with the first locking surface 101 through the first engagement surface 201, to lock the lock tongue 100 at the first locking position. The second pawl 300 includes a second engagement surface 301. The second pawl 300 is engaged with the second locking surface 102 through the second engagement surface 301, to lock the lock tongue 100 at the second locking position.

The overall shape of the first pawl 200 in FIG. 4 is only a preferred shape of the first pawl 200 of the present disclosure, and adjustment on the shape of the first pawl 200 made by those skilled in the art based on a full understanding of the technical solutions of the present disclosure falls within the protection scope of the present disclosure.

Refer to FIG. 1 and FIG. 2. For the lock device 1000 of each of the foregoing implementations, the first engagement surface 201 is an arc-shaped surface, and a center of the first engagement surface 201 does not coincide with the rotation center of the first pawl 200, so that in an event that pressed, the first engagement surface 201 generates torque that enables the first pawl 200 to rotate towards a direction of unlocking the lock tongue 100.

For the lock device 1000 of each of the foregoing implementations, the center (B) of the first engagement surface 201 is located at an outer position of the rotation center of the first pawl 200, and the outer position is not located in a position area between a rotation center of the lock tongue 100 and the rotation center of the first pawl 200.

FIG. 4 shows the rotation center A of the first pawl 200, and exemplarily shows the center B of the first engagement surface 201.

A position of the center of the first engagement surface 201 is set by setting a shape of the first engagement surface 201 of this implementation, so that the center of the first engagement surface 201 is shifted to an outer side of the first pawl 200 to reduce unlocking force.

For the lock device 1000 of each of the foregoing implementations, the first pawl 200 locks the lock tongue 100 in the first locking position based on a first driving action of the control member 400, and the first pawl 200 releases the lock tongue 100 from the first locking position based on a second driving action of the control member 400.

Refer to FIG. 4. For the lock device 1000 of each of the foregoing implementations, the first pawl 200 further includes a first limit surface 202, and the control member 400 applies the first driving action to the first limit surface 202, so that the first engagement surface 201 of the first pawl 200 is engaged with the first locking surface 101 of the lock tongue 100 to maintain the lock tongue 100 at the first locking position.

Refer to FIG. 4. For the lock device 1000 of each of the foregoing implementations, the first pawl 200 further includes a first drive surface 203, and the control member 400 applies the second driving action to the first drive surface 203, so that the first engagement surface 201 of the first pawl 200 is disengaged from the first locking surface 101 of the lock tongue 100 to release the lock tongue 100 from the first locking position.

Refer to FIG. 1. According to a preferred implementation of the present disclosure, the lock device 1000 further includes a limit block 600. In an event that the first pawl 200 locks the lock tongue 100 in the first locking position based on the first driving action of the control member 400, the limit block 600 limits the control member 400 at a first limit position, so that the control member 400 maintains engagement of the first engagement surface 201 of the first pawl 200 with the first locking surface 101 of the lock tongue 100.

Preferably, in an event that the first pawl 200 releases the lock tongue 100 from the first locking position based on the second driving action of the control member 400, the control member 400 separates from the first limit position.

According to the lock device 1000 of the preferred implementation of the present disclosure, in an event that the control member 400 is limited in the first limit position by the limit block 600, the elastic part 500 applies the elastic force to the control member 400, to maintain the control member 400 at the first limit position.

Figure 7:
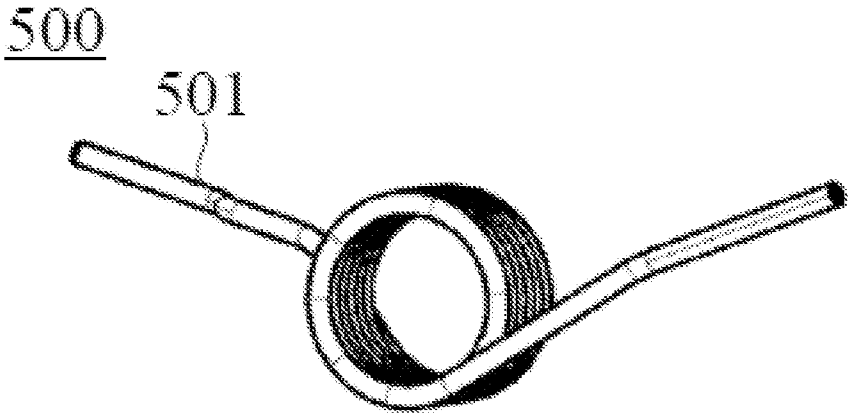
FIG. 7 is a schematic structural diagram of an elastic part of the lock device according to an implementation of the present disclosure.

The elastic part 500 may be a spring. Refer to FIG. 7. The spring has an elastic arm 501 (clamping pin), and the spring applies elastic force to the control member 400 through the elastic arm 501.

Figure 5:
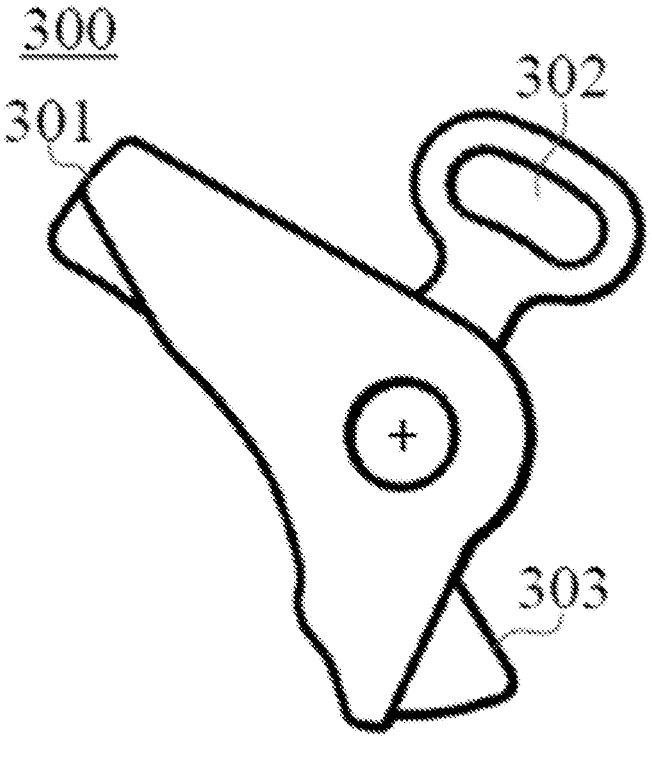
FIG. 5 is a schematic structural diagram of a second pawl of the lock device according to an implementation of the present disclosure.
Figure 6:
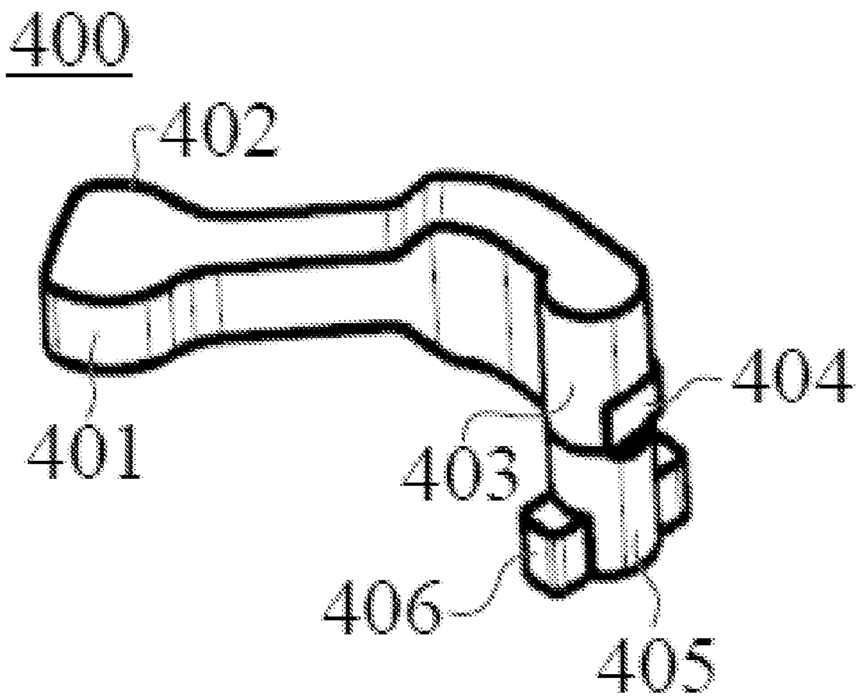
FIG. 6 is a schematic structural diagram of a control member of the lock device according to an implementation of the present disclosure.

Refer to FIG. 5 and FIG. 6. For the lock device 1000 of each of the foregoing implementations, the second pawl 300 includes a clamping slot part 302, the control member 400 includes a driven part, and the driven part is disposed in the clamping slot part 302, so that the control member 400 can be driven by an action of the second pawl 300.

According to the lock device 1000 of this implementation, the clamping slot part 302 is disposed on the second pawl 300, so that the second pawl 300 can drive the control member 400 to move.

Preferably, the driven part of the control member 400 is clamped in the clamping slot part 302, and can slide/move in a slot of the clamping slot part 302.

Refer to FIG. 5. For the lock device 1000 of each of the foregoing implementations, the second pawl 300 includes a second drive surface 303, and the second drive surface 303 is used for receiving a driving action of an external drive mechanism.

Refer to FIG. 6. For the lock device 1000 of each of the foregoing implementations, the driven part of the control member 400 includes a cylindrical part 405 and a limit part 406, the cylindrical part 405 is disposed in the clamping slot part 302 through insertion, and the limit part 406 limits the cylindrical part 405 in the clamping slot part 302, to prevent the driven part from separating from the clamping slot part 302.

The structure of the control member 400 shown in FIG. 6 is only a structure of the control member in the preferred implementation of the present disclosure, and adjustment on the structure of the control member made by those skilled in the art based on a full understanding of the technical solutions of the present disclosure falls within the protection scope of the present disclosure.

Figure 8:
FIG. 8 is a schematic structural diagram of a limit block of the lock device according to an implementation of the present disclosure.
Figure 9:
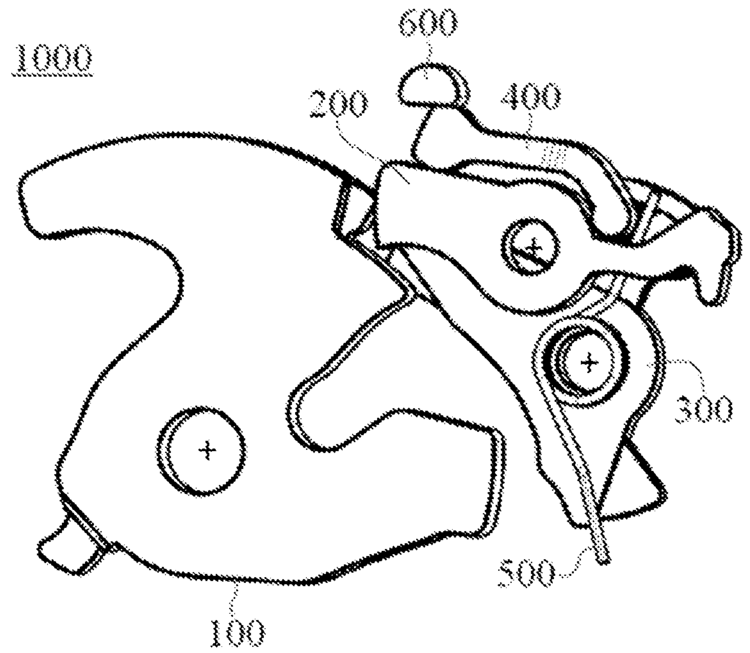
FIG. 9 is a schematic structural diagram of another perspective of the lock device according to an implementation of the present disclosure.
Figure 10:
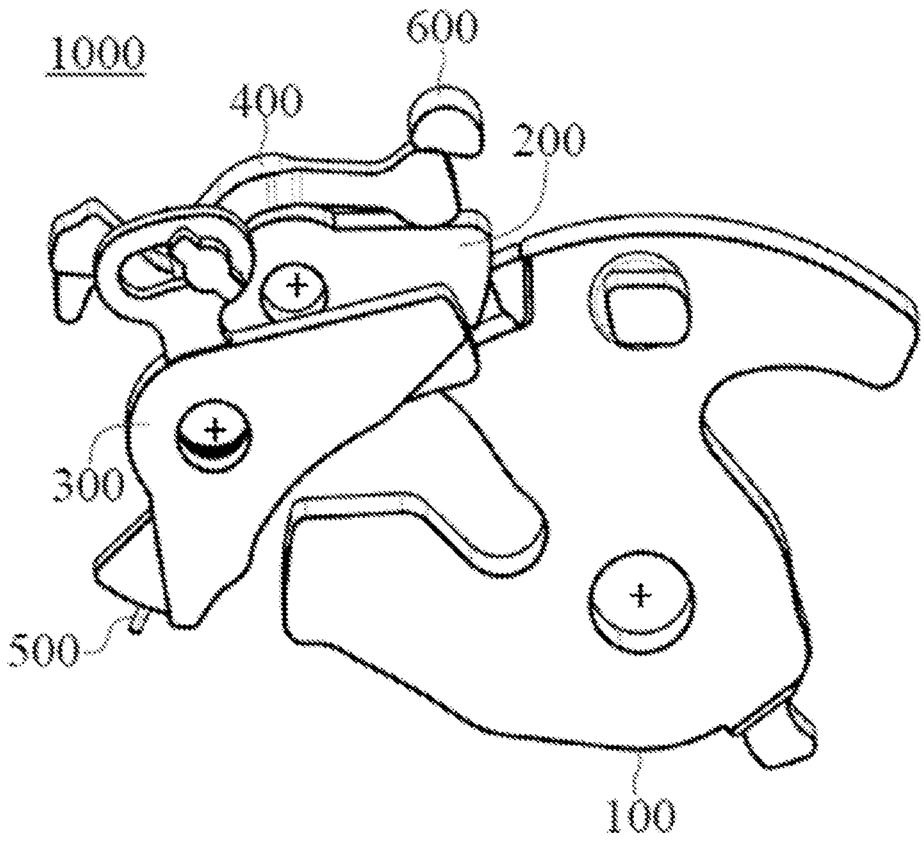
FIG. 10 is a schematic structural diagram of still another perspective of the lock device according to an implementation of the present disclosure.

Refer to FIG. 6 and FIG. 8. The control member 400 includes a control member engagement surface 401 and a control member limit surface 402, the control member 400 applies the first driving action to the first limit surface 202 of the first pawl 200 through the control member engagement surface 401, and the limit block 600 limits the control member 400 through the control member limit surface 402.

For the lock device 1000 of each of the foregoing implementations, the control member 400 includes a control member drive part 403, and the control member 400 applies the second driving action to the first drive surface 203 of the first pawl 200 through the control member drive part 403.

According to the preferred implementation of the present disclosure, the control member drive part 403 is in a cylindrical shape.

Preferably, the control member drive part 403 is coaxial or substantially coaxial with the cylindrical part 405.

According to the preferred implementation of the present disclosure, the first drive surface 203 is in a concave shape.

For the lock device 1000 of each of the foregoing implementations, a plane part 404 is formed on the control member drive part 403, and the elastic part 500 applies the elastic force to the control member 400 through the plane part 404.

For the lock device 1000 of each of the foregoing implementations, the second driving action described above separates the first pawl 200 from the first locking position (that is, from the first limit position).

For the lock device 1000 of each of the foregoing implementations, preferably, the elastic part 500 applies the elastic force to the plane part 404 of the control member 400 through the elastic arm 501, to push the control member 400 to the first limit position (that is, the first locking position).

Refer to FIG. 8. For the lock device 1000 of each of the foregoing implementations, the limit block 600 includes a limit fitting surface 601, and the limit block 600 limits, through the limit fitting surface 601, the control member 400 in the first limit position.

According to another aspect of the present disclosure, a motor vehicle is provided, including: a cover or door. The cover or door is provided with the lock device 1000 of any of the foregoing implementations.

An unlocking process of the lock device of the present disclosure is described in detail below with reference to FIG. 11 to FIG. 15.

Figure 11:
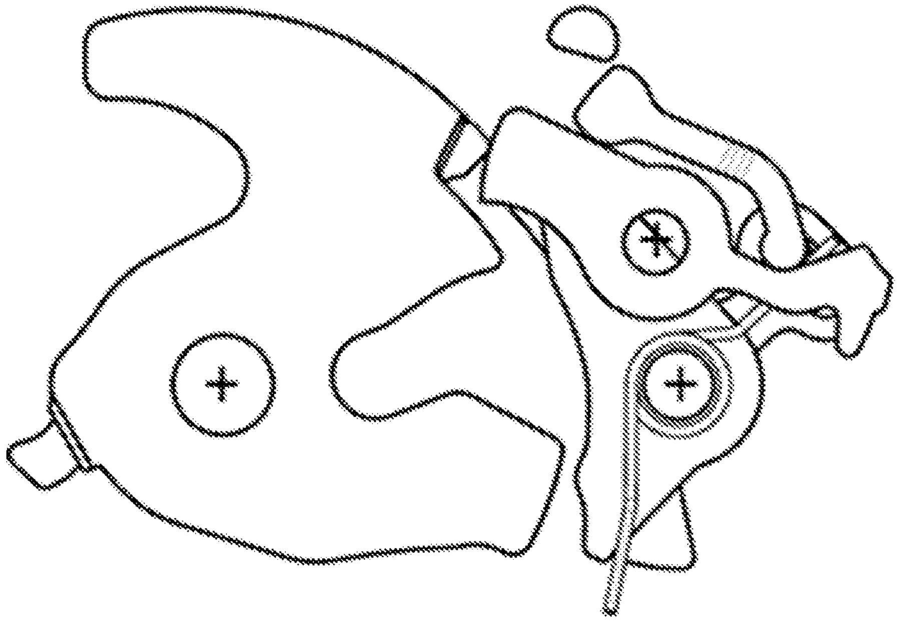
FIG. 11 to FIG. 15 are schematic diagrams of an unlocking process of the lock device according to an implementation of the present disclosure.
Figure 12:
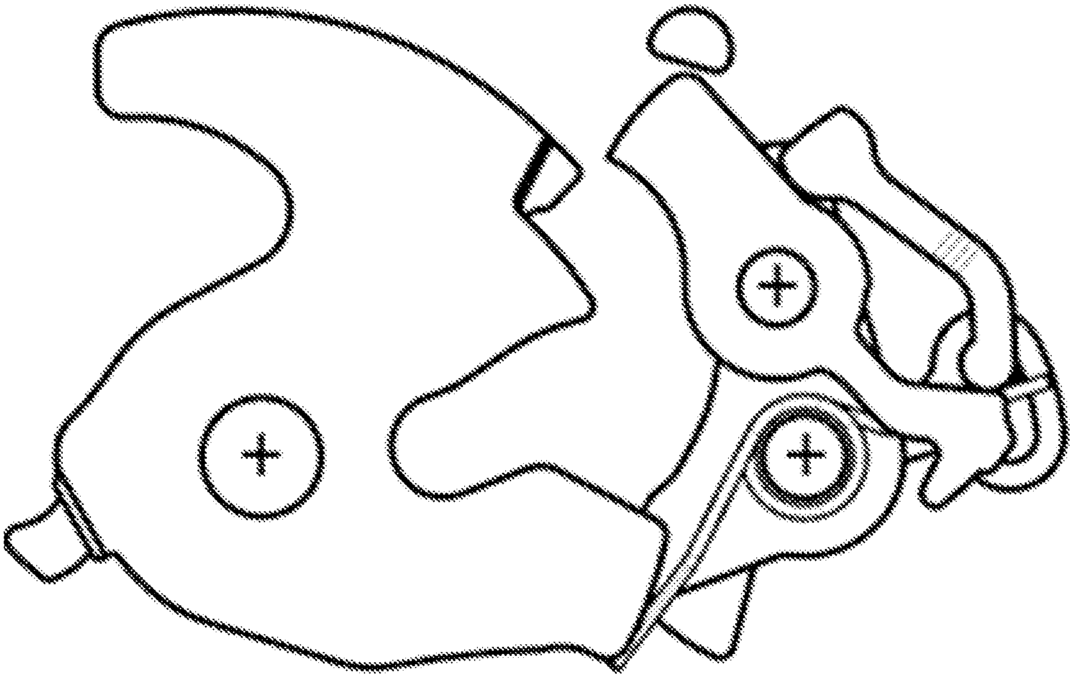
Figure 13:
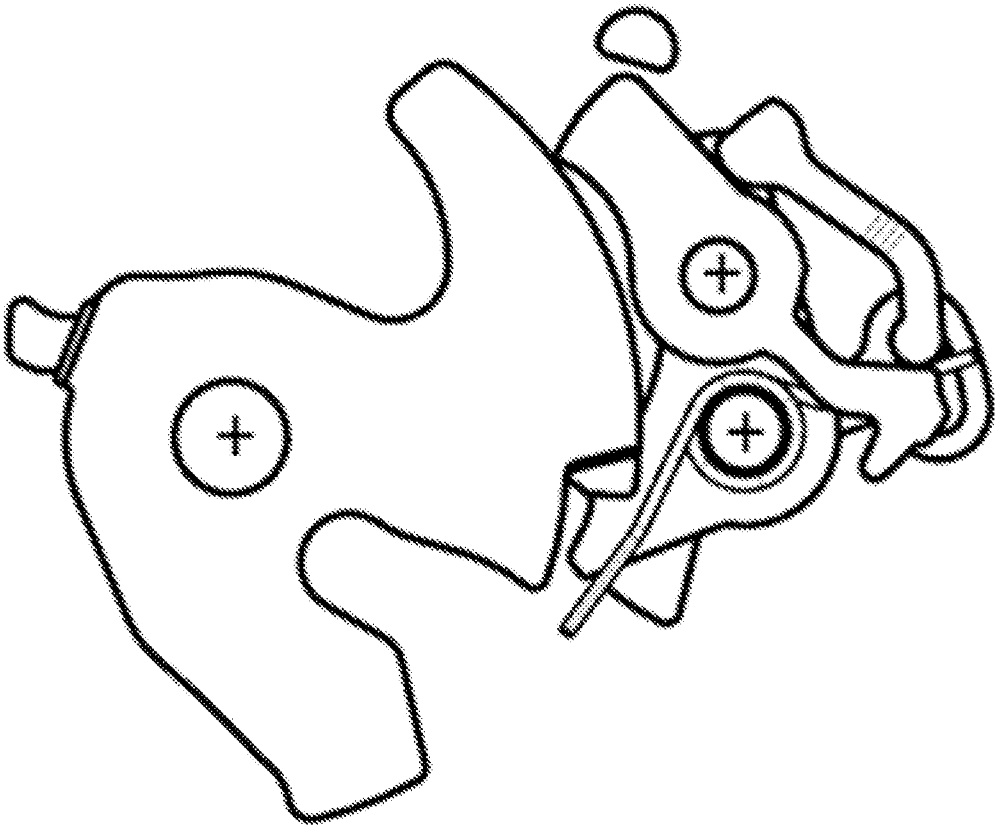
Figure 14:
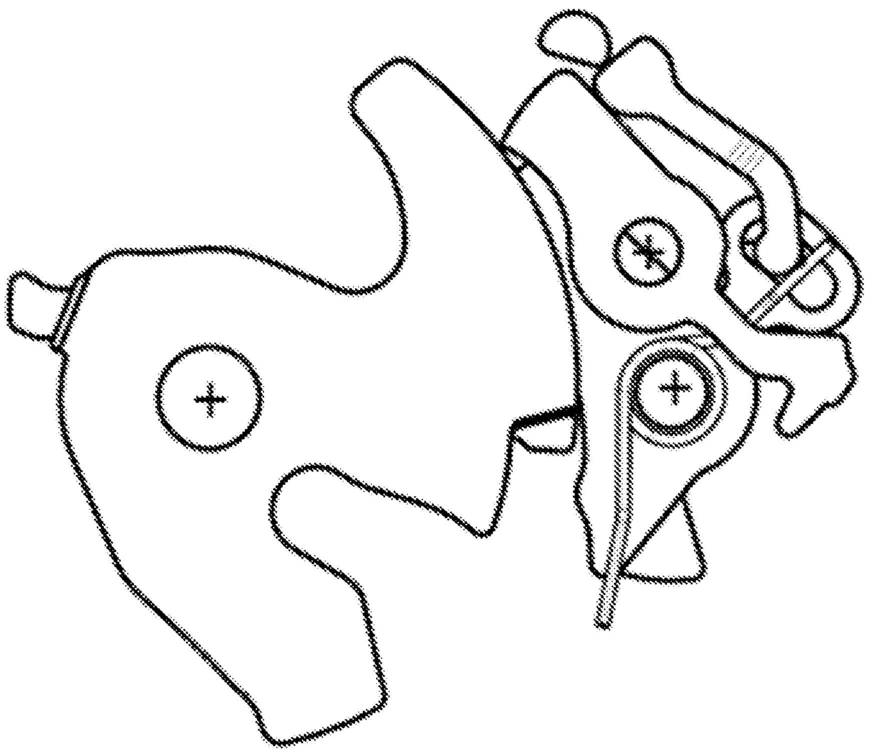
Figure 15:
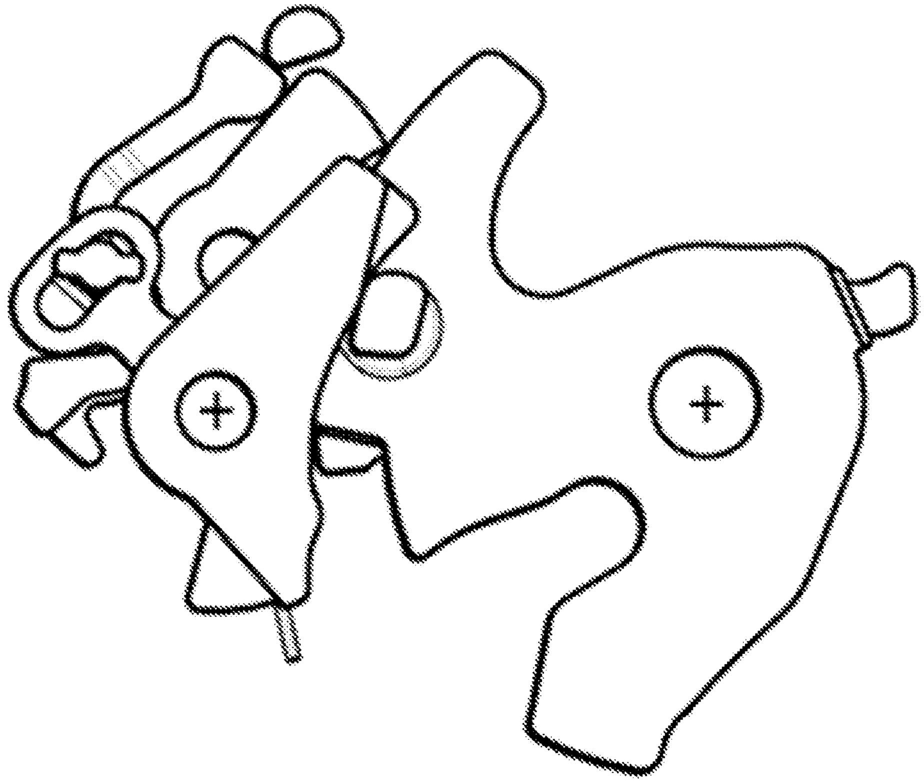

Initially, the lock tongue 100 is locked in the primary locking position (the first locking position) by the first pawl 200. In an event that the second drive surface 303 of the second pawl 300 is pushed by an unlocking mechanism (not shown), the second pawl 300 drives the control member 400 to rotate counterclockwise, so that the control member 400 separates from the limit block 600, as shown in FIG. 11. Then, the second pawl 300 continues to drive the control member 400 to rotate clockwise, and the drive part 403 (which may be in a form of a drive surface) pushes, through the first drive surface 203, the first pawl 200 to rotate clockwise, so that the first pawl 200 is separated from the first locking surface 101, and the lock tongue 100 is unlocked, as shown in FIG. 12. After that, the lock tongue 100 rotates clockwise to a full open position, as shown in FIG. 13. After the second drive surface 303 of the second pawl 300 is released, the first pawl 200 and the second pawl 300 stop against the lock tongue 100 under the action of the elastic part 500 (which functions as a return spring), and the control member 400 stops against the limit block 600 under the action of the elastic part 500, so that the lock device implements unlocking. As shown in FIG. 14 and FIG. 15, FIG. 14 and FIG. 15 show an unlocked state of the lock device from different perspectives.

A locking process of the lock device of the present disclosure is described in detail below with reference to FIG. 16 to FIG. 21.

Figure 16:
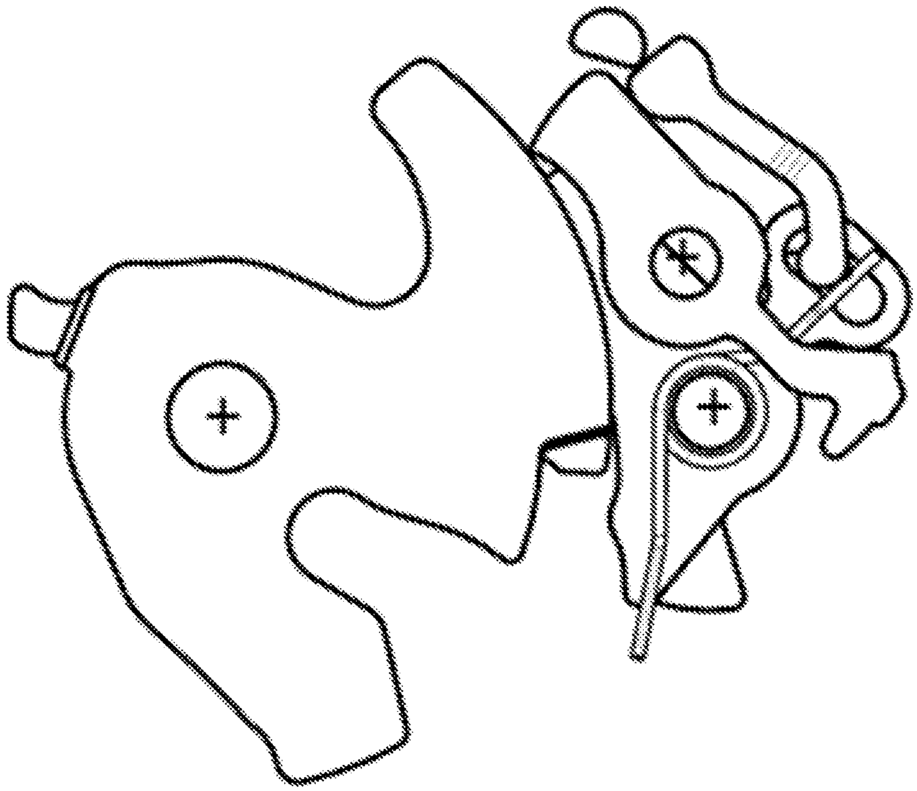
FIG. 16 to FIG. 21 are schematic diagrams of a locking process of the lock device according to an implementation of the present disclosure.
Figure 17:
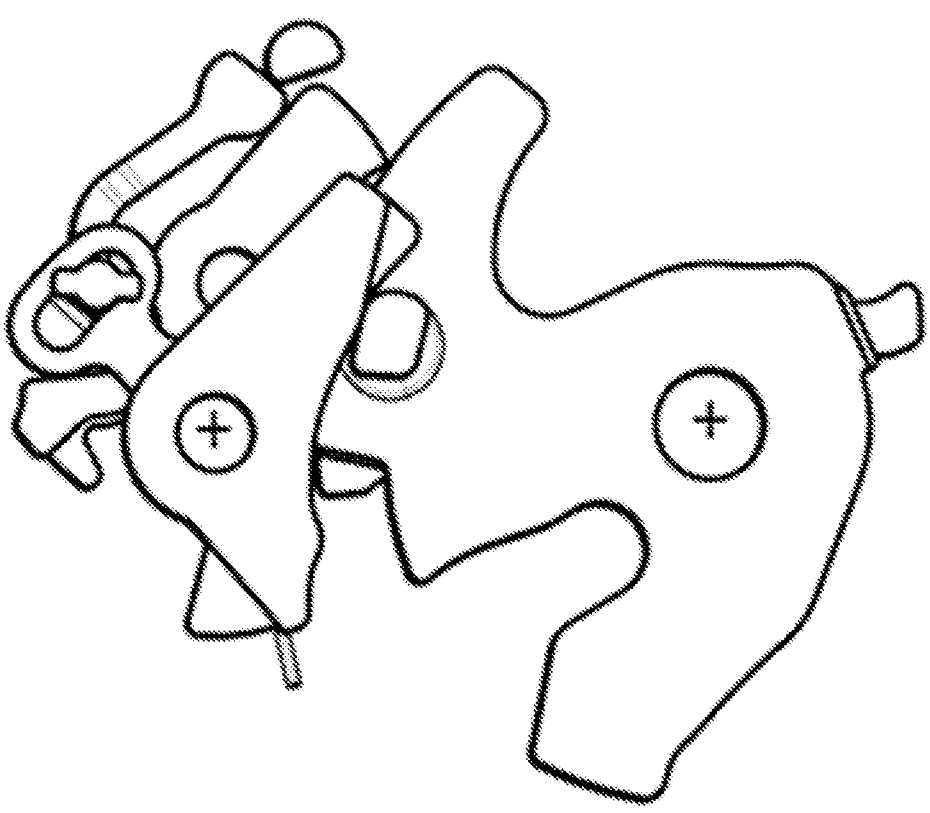

FIG. 16 and FIG. 17 show, from different perspectives, the lock tongue 100 in the full open position and the first pawl 200 and the second pawl 300 stopping against the lock tongue 100.

Figure 18:
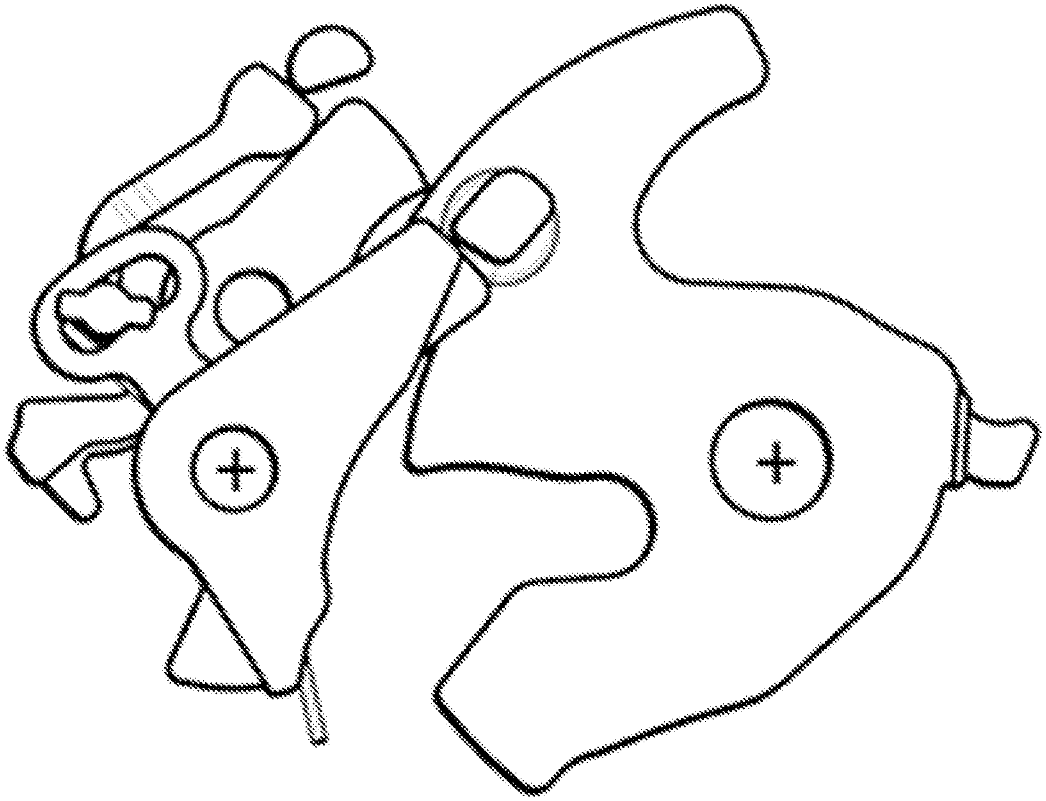
Figure 19:
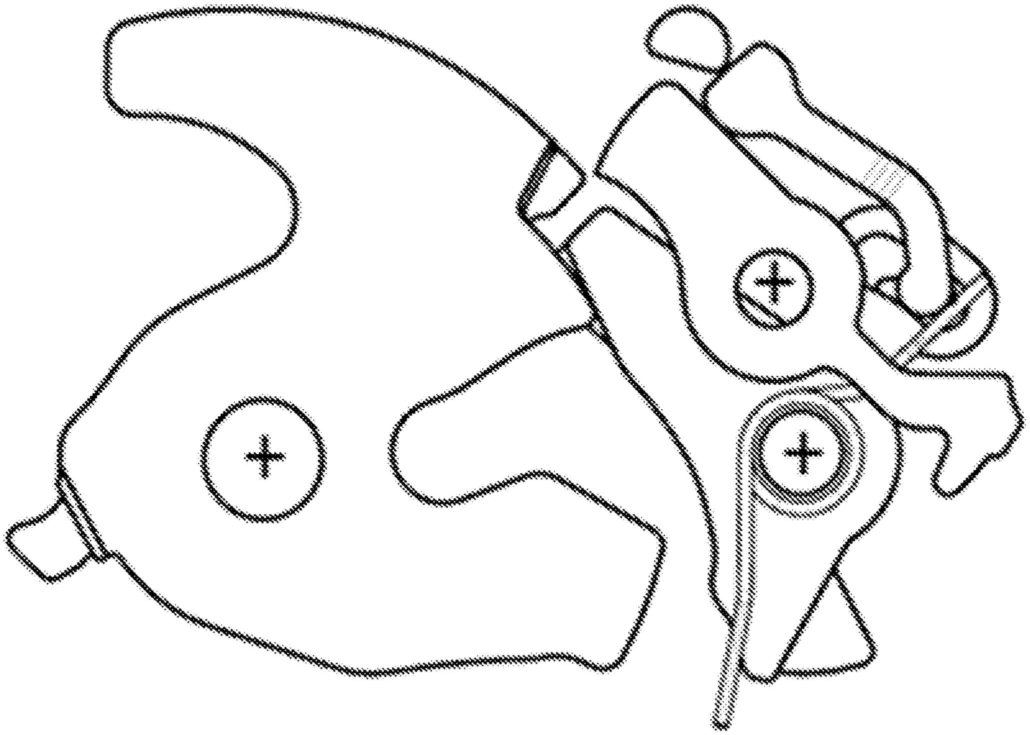
Figure 20:
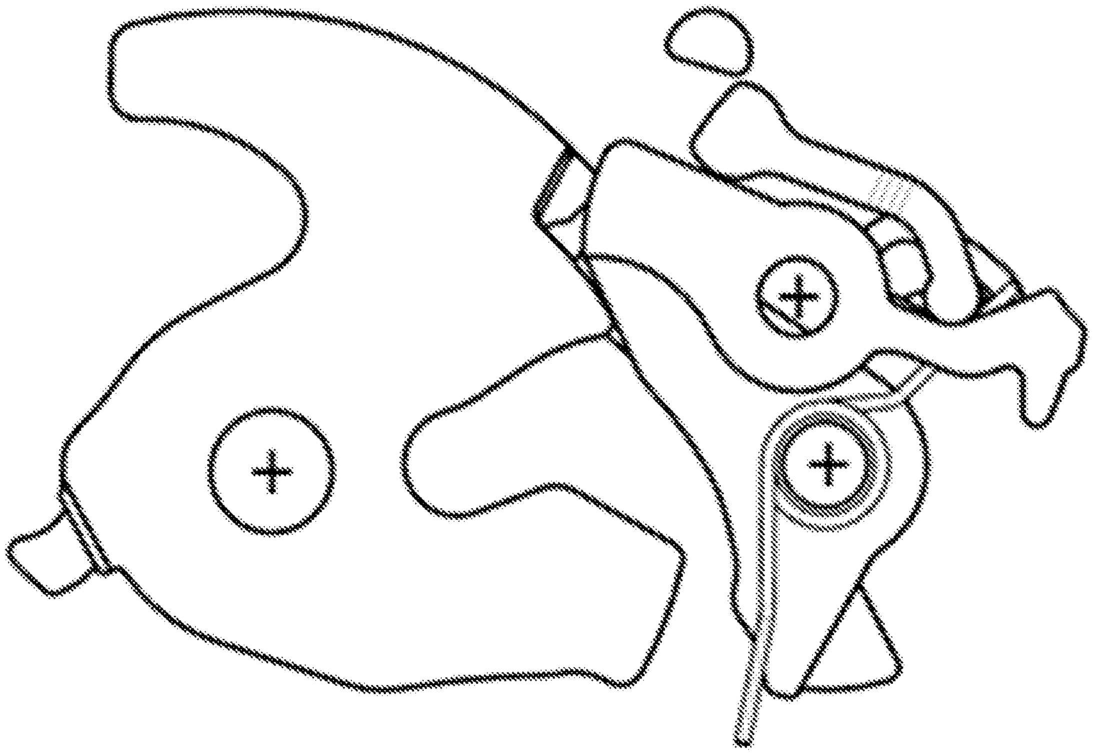
Figure 21:
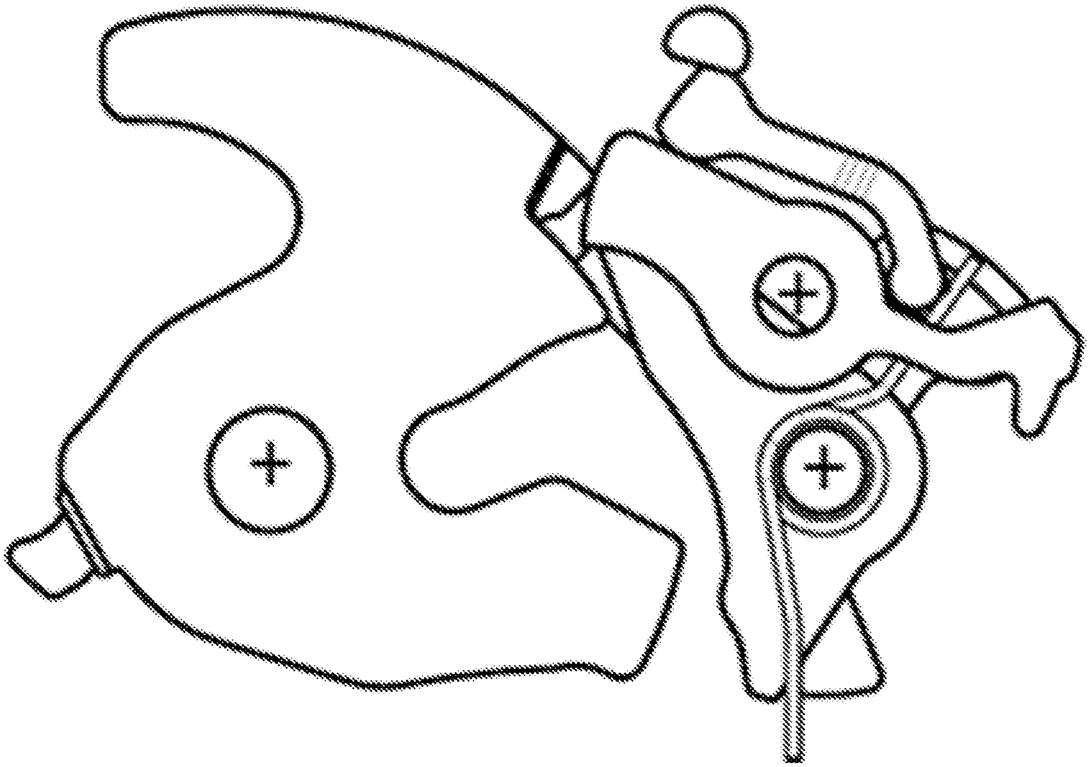

In an event that the lock tongue 100 is pushed to rotate to the secondary locking position (the second locking position), the second pawl 300 rotates clockwise (in FIG. 16) to enter the secondary locking position, so that the lock device 1000 implements locking at the secondary locking position, as shown in FIG. 18. Then, in an event that the lock tongue 100 continues to rotate to the primary locking position (the first locking position), the first pawl 200 enters the primary locking position to lock the lock tongue 100 in the primary locking position, and meanwhile, the control member 400 is inserted between the first pawl 200 and the limit block 600 under the action of a control member spring (the elastic part 500), so that the first pawl 200 is limited in the primary locking position, to improve reliability of the lock device, as shown in FIG. 19 to FIG. 21.

According to the lock device of the present disclosure, for example, locking reliability of the first pawl and the lock tongue is improved by designing the control member, the elastic part (the control member spring), and the limit block on the outer side of the first pawl, and the first pawl is released through a connection between the second pawl and the control member, and the unlocking force is reduced. The lock device of the present disclosure has a compact and simple structure and high execution efficiency, and is suitable for various cover or door systems, particularly for a cover or door of an automobile system.

In the description of this specification, reference to the description of "one embodiment/implementation", "some embodiments/implementations", "example", "specific example" or "some examples", and the like means that a specific feature, structure, material, or characteristic described in conjunction with the embodiment/implementation or example is included in at least one embodiment/implementation or example of the present disclosure. In this specification, the schematic descriptions of the foregoing terms do not necessarily refer to the same embodiment/implementation or example. In addition, the specific feature, structure, material, or characteristic described may be combined in any one or more embodiments/implementations or examples in an appropriate manner. In addition, on the premise of no conflict, those skilled in the art may combine different embodiments/implementations or examples and features of the different embodiments/implementations or examples described in this specification.

In addition, the terms "first" and "second" are only intended for a purpose of description, and cannot be understood as indicating or implying relative importance or implicitly indicating the quantity of indicated technical features. Therefore, a feature limited by "first" or "second" may explicitly or implicitly include at least one of the features. In the descriptions of the present disclosure, unless otherwise explicitly and specifically limited, the term "a plurality of" means at least two, for example, two, three, and the like.

Those skilled in the art should understand that the foregoing implementations are only for clearly describing the present disclosure and not intended to limit the scope of the present disclosure. For those skilled in the art, other changes or variations may further be made based on the foregoing disclosure, and these changes or variations also fall within the scope of the present disclosure.

What is claimed:

1. A lock device, comprising:
- a lock tongue;
- a first pawl being capable of engaging the lock tongue in a first locking position of the lock tongue;
- a second pawl being capable of engaging the lock tongue in a second locking position of the lock tongue; and
- a control member,
- wherein the control member is capable of blocking the engagement of the first pawl with the lock tongue in the first locking position,
- the second pawl cooperates simultaneously or sequentially with the control member and the first pawl in a moving process of the second pawl, to enable the first pawl to rotate in a direction in which the first pawl disengages from the lock tongue, and
- the lock device further comprises spring that applies an elastic force to the control member to enable the control member to drive the first pawl in a direction in which the first pawl engages with the lock tongue in the first locking position, wherein the spring has an elastic arm, and the spring applies the elastic force to the control member by the clastic arm,
- the lock device further comprises a limit block, wherein in the first locking position and based on a first driving action of the control member, the limit block limits the control member at a first limit position, such that the spring applies the elastic force to the control member to maintain the control member at the first limit position, wherein the first pawl and the second pawl have different rotation centers, the lock tongue comprises a first locking surface formed by a first portion of the lock tongue and a second locking surface formed by a second portion of the lock tongue, the first pawl engages the first locking surface when the lock tongue is in the first locking position, the second pawl engages the second locking surface when the lock tongue is in the second locking position, the first portion and the second portion are located in different planes perpendicular to a rotation axis of the lock tongue.

2. The lock device of claim 1, wherein the first pawl comprises a first engagement surface, and the first pawl is engaged with the first locking surface by the first engagement surface, so at to lock the lock tongue in the first locking position; and the second pawl comprises a second engagement surface, and the second pawl is engaged with the second locking surface by the second engagement surface, so at to lock the lock tongue in the second locking position.

3. The lock device of claim 2, wherein the first engagement surface is an arc-shaped surface, and a center of the first engagement surface does not coincide with the rotation center of the first pawl, such that when the first engagement surface is pressed, the first engagement surface generates a torque that enables the first pawl to rotate in a direction in which the first pawl disengages from the lock tongue.

4. The lock device of claim 3, wherein the center of the first engagement surface is located at an outer position relative to the rotation center of the first pawl, and the outer position is not located in a position area between a rotation center of the lock tongue and the rotation center of the first pawl.

5. The lock device of claim 4, wherein the first pawl releases the lock tongue from the first locking position based on a second driving action of the control member.

6. The lock device of claim 5, wherein the first pawl further comprises a first limit surface, and the control member applies the first driving action to the first limit surface, so that the first engagement surface of the first pawl is engaged with the first locking surface of the lock tongue to maintain the lock tongue in the first locking position.

7. The lock device of claim 6, wherein the first pawl further comprises a first drive surface, and the control member applies the second driving action to the first drive surface, so that the first engagement surface of the first pawl is disengaged from the first locking surface of the lock tongue to release the lock tongue from the first locking position.

8. A motor vehicle, comprising a cover or a door, wherein the cover or the door is provided with the lock device of claim 1.

* * * * *